(12) United States Patent
Harriman

(10) Patent No.: US 8,063,621 B2
(45) Date of Patent: Nov. 22, 2011

(54) CURRENT BALANCING CIRCUIT AND METHOD

(75) Inventor: Paul J. Harriman, Hillsboro, OR (US)

(73) Assignee: Semiconductor Components Industries LLC, Phoenix, AZ (US)

( * ) Notice: Subject to any disclaimer, the term of this patent is extended or adjusted under 35 U.S.C. 154(b) by 510 days.

(21) Appl. No.: 12/265,027

(22) Filed: Nov. 5, 2008

(65) Prior Publication Data

US 2010/0109713 A1    May 6, 2010

(51) Int. Cl.
*G05F 1/40* (2006.01)
(52) U.S. Cl. ........................ 323/284; 323/272
(58) Field of Classification Search ................. 323/224, 323/225, 269, 272, 282–288, 207, 210, 222, 323/268, 271; 363/19–20, 21.02, 72, 131
See application file for complete search history.

(56) References Cited

U.S. PATENT DOCUMENTS 7,301,400 B1 * 11/2007 Dening ........................ 330/276

OTHER PUBLICATIONS

Abu-Qahouq et al., Multiphase Voltage-Mode Hysteretic Controlled DC-DC Converter With Novel Current Sharing, IEEE Transactions on Power Electronics, vol. 19, No. 6, Nov. 2004.
Sun, Dynamic Performance Analyses of Current Sharing Control for DC/DC Converters, Dissertation submitted to the Faculty of the Virginia Polytechnic Institute and State University in partial fulfillment of the requirements for the degree of Doctor of Philosophy in Engineering. Jun. 13, 2007; Blacksburg, Virginia.

* cited by examiner

*Primary Examiner* — Rajnikant Patel
(74) *Attorney, Agent, or Firm* — Rennie William Dover

(57) ABSTRACT

A multi-phase power converter and a method for balancing a plurality of currents in the multi-phase power converter. The multi-phase power converter that includes a pulse width modulator coupled to an oscillator. A plurality of currents are generated in response to output signals from the pulse width modulator. The levels of the currents are sensed and a sense signal is transmitted to the pulse width modulator. Switching circuitry within the pulse width modulator switches signals from the oscillator in accordance with the current levels, the levels of the signals from the oscillator, and whether at least one of the signals from the oscillator is either rising or falling.

20 Claims, 3 Drawing Sheets

US 8,063,621 B2

CURRENT BALANCING CIRCUIT AND METHOD

TECHNICAL FIELD

This invention relates, in general, to power converters and, more particularly, to multi-phase power converters.

BACKGROUND

Power converters are used in a variety of electronic products including automotive, aviation, telecommunications, and consumer electronics. Power converters such as Direct Current to Direct Current ("DC-DC") converters have become widely used in portable electronic products such as laptop computers, personal digital assistants, pagers, cellular phones, etc., which are typically powered by batteries. DC-DC converters are capable of delivering multiple voltages from a single voltage independent of the load current being drawn from the converter or from any changes in the power supply feeding the converter. One type of DC-DC converter that is used in portable electronic applications is a buck converter. This converter, also referred to as a switched mode power supply, is capable of switching an input voltage from one voltage level to a lower voltage level. A buck converter is typically controlled by a controller that can be configured to be a multi-phase controller having a plurality of output current channels that switch at different times. The output currents flowing in the output current channels are summed and delivered to the load. An advantage of this configuration is that each channel conducts a portion of the total load current. For example, in a 4-phase buck controller, each channel conducts 25% of the output current. This lowers the power dissipated by each output. A drawback with a multi-phase buck controller is that when the currents are not balanced, one of the current channels will conduct more current than the other current channels, which could lead to thermal failure. Another drawback is that a dynamic load coupled to the controller may have the same repetition rate as one of the outputs of the multi-phase buck converter. In this case, the currents in the channels become unbalanced causing the converter to suffer thermal failure.

Accordingly, it would be advantageous to have a multi-phase controller circuit and a method of operating the multi-phase controller circuit that maintains a balanced current at its outputs. In addition, it is desirable for the multi-phase controller circuit to be cost and time efficient to manufacture.

BRIEF DESCRIPTION OF THE DRAWINGS

The present invention will be better understood from a reading of the following detailed description, taken in conjunction with the accompanying drawing figures, in which like reference characters designate like elements and in which.

DETAILED DESCRIPTION

Generally, the present invention provides a multi-phase power converter and a method for balancing current in the multi-phase power converter. In accordance with an embodiment of the present invention, current balancing is accomplished by actively rearranging or swapping the output signals from an oscillator in accordance with the phase output currents. By swapping the oscillator signals, current sharing can be maintained during dynamic loading without impacting the total duty cycle delivered to the output. Preferably, the oscillator signals are swapped when they have substantially the same values, i.e., at the ramp intersections for oscillator signals having a triangular waveform. Swapping at the ramp intersections reduces the impact on the oscillator signals and on the modulation of the output signals.

Figure 1:
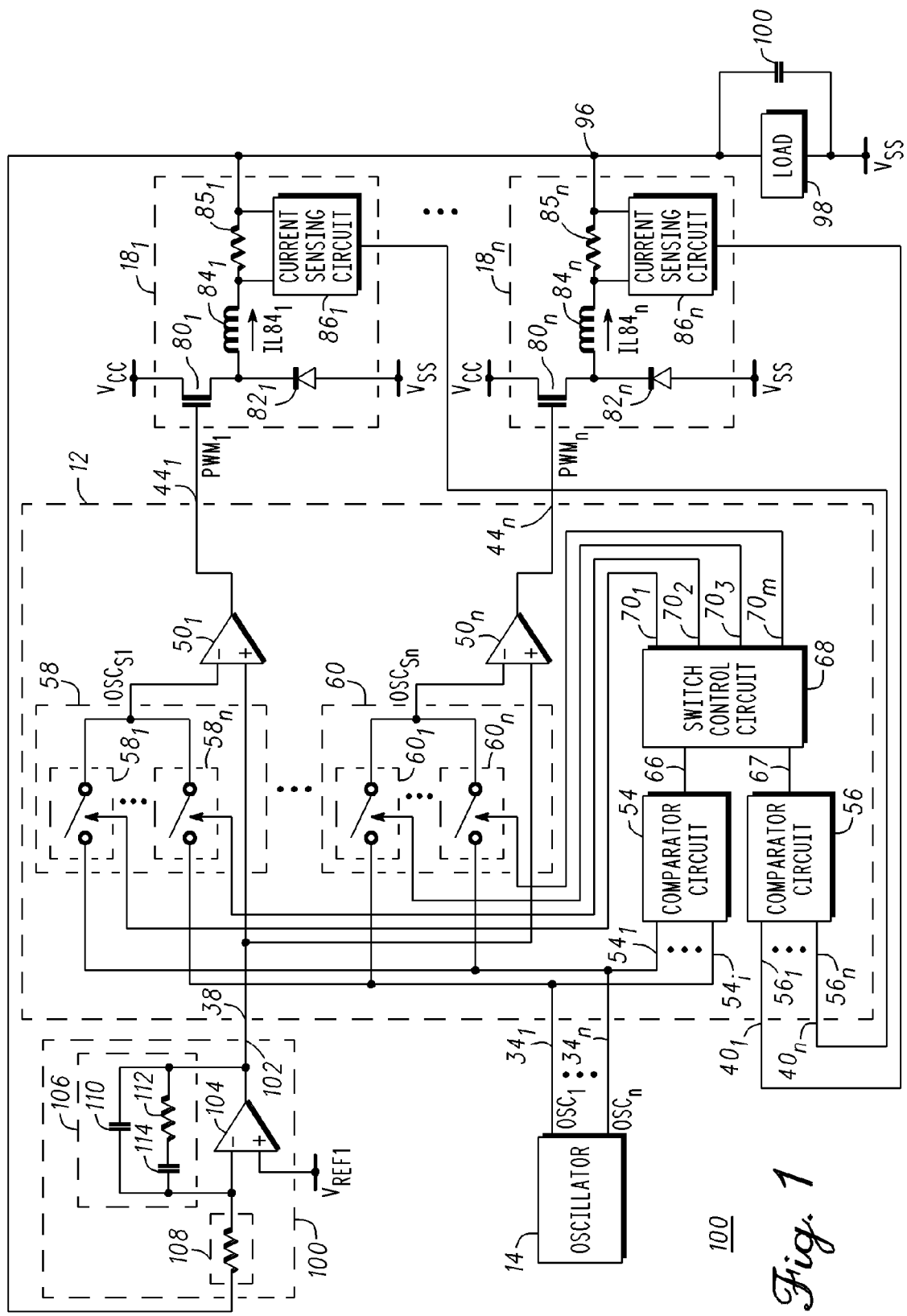
FIG. 1 is a schematic diagram of a multi-phase controller circuit in accordance with an embodiment of the present invention.

FIG. 1 is a block diagram of a multi-phase power converter 10 manufactured in a semiconductor substrate in accordance with an embodiment of the present invention. What is shown in FIG. 1 is a Pulse Width Modulator ("PWM") circuit 12 coupled to an oscillator circuit 14, an error amplifier 100, and to output driver circuits $18_1, \ldots, 18_n$. In accordance with an embodiment of the present invention, PWM circuit 12 comprises selector switches 58 and 60 coupled to comparators $50_1, \ldots, 50_n$, comparator circuits 54 and 56, and to a switch control circuit 68. Selector switch 58 is also referred to as an analog signal multiplexer (MUX) and comprises switches $58_1, \ldots, 58_n$. Similarly, selector switch 60, also referred to as an analog signal MUX, comprises switches $60_1, \ldots, 60_n$. Comparators $50_1, \ldots, 50_n$ each have an inverting input, a non-inverting input, and an output and comparator circuits 54 and 56 each comprise a set of comparators that compare every oscillator signal to every other oscillator signal. PWM circuit 12 further includes oscillator inputs $34_1, \ldots 34_n$, an error signal input 38, current sense inputs $40_1, \ldots, 40_n$, and PWM outputs $44_1, \ldots, 44_n$. It should be noted that the number of oscillator inputs, PWM outputs, switch control inputs, and error signal inputs are not limitations of the present invention and that reference character n that is appended to reference characters 18, 34, 40, 50, and 60 is a variable representing an integer.

The inverting input of comparator $50_1$ is coupled to input $34_n$ of PWM circuit 12 and to an input $54_1$ of comparator circuit 54 through switch $58_1$ of selector switch 58. The inverting input of comparator $50_n$ is also coupled to input $34_1$ of PWM circuit 12 through a switch $58_n$ and to the inverting input of comparator $50_n$ through switch $58_n$ of selector switch 58 and through switch $60_1$ of selector switch 60. In addition to being coupled to the inverting input of comparator $50_1$, the inverting input of comparator $50_n$ is also connected to input $54_1$ of comparator circuit 54 through switch $60_n$ of selector switch 60 and to input $54_i$ of comparator circuit 54 through switch $60_1$ of selector switch 60. It should be noted that reference character i that is appended to reference character 54 is a variable representing an integer. The non-inverting inputs of comparators $50_1, \ldots, 50_n$ are connected to input 38 of PWM circuit 12.

Switch control circuit 68 has an input 66 connected to the output of comparator circuit 54, an output $70_1$ connected to switch $58_1$, an output $70_2$ connected to switch $58_n$, an output $70_3$ connected to switch $60_1$ of selector circuit 60 and an output $70_m$ connected to switch $60_n$ of selector circuit 60. The number of outputs of switch control circuit 68 is not a limitation of the present invention, thus reference character m that is appended to reference character 70 is a variable representing an integer. An output of comparator circuit 56 is connected to an input 67 of switch control circuit 68.

Output driver circuit $18_1$ comprises an N-channel field effect transistor $80_1$ having a gate connected to output $44_1$ of PWM 12, a drain coupled for receiving a source of operating potential $V_{CC}$, a source coupled through a diode $82_1$ for receiving a source of operating potential $V_{SS}$ and to an output node 96 through an inductor $84_1$ and a resistor $85_1$. It should be noted that the gate of a field effect transistor and the base of a bipolar junction transistor are also referred to as control electrodes and the source and drain of a field effect transistor and the collector and emitter of a bipolar junction transistor are also referred to as current carrying or current conducting electrodes. Output driver $18_1$ further includes a current sensing circuit $86_1$ having inputs coupled across resistor $85_1$ and an output connected to current sensing input $40_n$ of PWM circuit 12. Current sensing circuit $86_1$ in combination with resistor $85_1$ sense the current level flowing through inductor $84_1$ and transmits a current sense signal to comparator circuit 56.

Output driver circuit $18_n$ comprises an N-channel field effect transistor $80_n$ having a gate connected to output $44_n$ of PWM 12, a drain coupled for receiving a source of operating potential $V_{CC}$, a source coupled through a diode $82_n$ for receiving source of operating potential $V_{SS}$ and to output node 96 through an inductor $84_n$ and a resistor $85_n$. Output driver $18_n$ further includes a current sensing circuit $86_n$ having inputs coupled across resistor $85_n$ and an output connected to current sensing input $40_1$ of PWM circuit 12. Current sensing circuit $86_n$ in combination with resistor $85_n$ sense the current level flowing through inductor $84_n$ and transmits a current sense signal to comparator circuit 56.

Multi-phase power converter 10 further includes error amplifier 100 having an output 102 connected to error input 38. In accordance with an embodiment of the present invention, error amplifier 100 comprises an operational amplifier 104 connected in a negative feedback configuration in which an impedance 106 is coupled between the output of operational amplifier 104 and its inverting input and an impedance 108 is connected to the inverting input of operational amplifier 104. By way of example, impedance 106 comprises a capacitor 110 coupled in parallel with a series connected resistor 112 and capacitor 114, and impedance 108 comprises a resistor. The non-inverting input of operational amplifier 104 is coupled for receiving a reference voltage level $V_{REF1}$. It should be understood that the feedback configuration of error amplifier 100 is not a limitation of the present invention and that it may be realized using other feedback configurations known to those skilled in the art.

A load 98 is coupled between output node 96 and a source of operating potential such as, for example, $V_{SS}$. An output capacitor 100 is connected in parallel with load 98. Output node 96 is connected in a feedback configuration to impedance 108.

Figure 2:
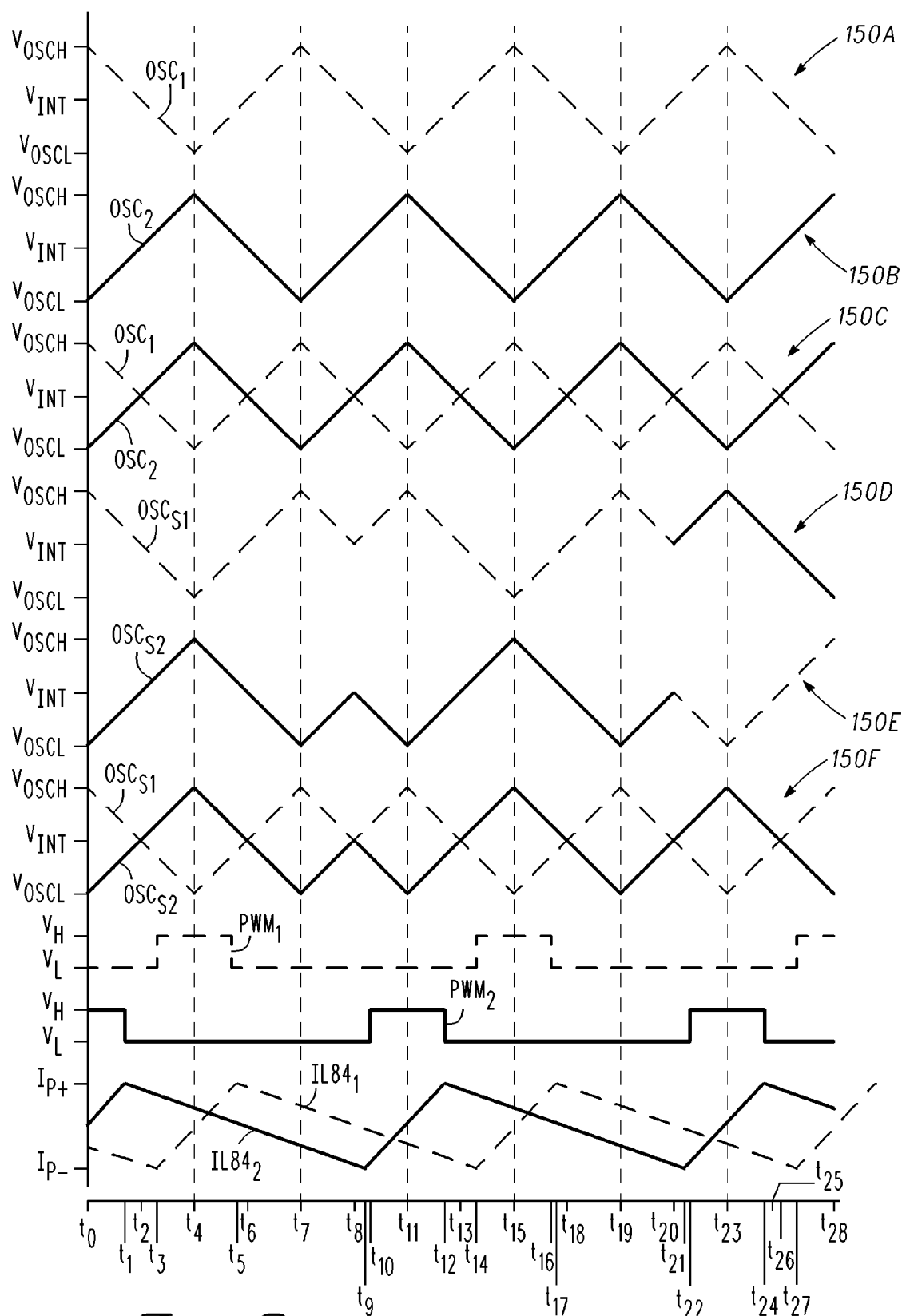
FIG. 2 is a timing diagram for a multi-phase controller circuit in accordance with an embodiment of the present invention.

FIG. 2 is a timing diagram 150 illustrating the temporal relationship between signals $OSC_1$ and $OSC_n$ from oscillator 14, input signals $OSC_{S1}$ and $OSC_{Sn}$ at the inverting inputs of comparators $50_1$ and $50_n$, respectively, pulse width modulated signals $PWM_1$ and $PWM_n$, at outputs $44_1$ and $44_n$, respectively, and inductor currents $IL84_1$ and $IL84_n$. For the sake of clarity, timing diagram 150 is a timing diagram for a two-phase power converter, i.e., a power converter for which n=2. Accordingly, elements $34_n$, $40_n$, $50_n$, $58_n$, $60_n$, $18_n$, $80_n$, $82_n$, $84_n$, $IL84_n$, and $86_n$ may be identified by reference characters $34_2$, $40_2$, $50_2$, $58_2$, $60_2$, $18_2$, $80_2$, $82_2$, $84_2$, $IL84_2$, and $86_2$, respectively. The number of phases is not a limitation of the present invention. Power converter 10 can be a two-phase power converter (n=2), a three-phase power converter (n=3), a four-phase power converter (n=4), etc. It should be noted that in a system with more than two phases, i.e., where n is greater than 2, every phase is compared to every other phase and swaps between phases are preferably performed at ramp intersections.

As discussed above, timing diagram 150 illustrates triangular waveforms or ramp signals generated by oscillator 14 for a 2-phase power converter. What is shown in FIG. 2 is an oscillator signal $OSC_1$ having a triangular waveform with an amplitude ranging from low voltage level $V_{OSCL}$ to high voltage level $V_{OSCH}$ and an oscillator signal $OSC_2$ having a triangular waveform with an amplitude ranging from low voltage level $V_{OSCL}$ to high voltage level $V_{OSCH}$. In accordance with some embodiments, oscillator signals $OSC_1$ and $OSC_2$ intersect at level $V_{INT}$, have the same frequency, and have phase angles that are separated by 180 degrees. For the sake of clarity, oscillator signal $OSC_1$ is drawn as a broken line and oscillator signal $OSC_2$ is drawn as a solid line. Plot 150A illustrates oscillator signal $OSC_1$, plot 150B illustrates oscillator signal $OSC_2$, and plot 150C illustrates oscillator signals $OSC_1$ and $OSC_2$ in a single plot. It should be noted that the types of waveform of oscillator signals $OSC_1$ and $OSC_2$ are not limitations of the present invention. For example, oscillator signals $OSC_1$ and $OSC_2$ can have saw tooth waveforms, sinusoidal waveforms, or the like.

Plot 150D illustrates an input signal $OSC_{S1}$ that appears at the inverting input of comparator $50_1$ and which is comprised of oscillator signal $OSC_1$ from times $t_0$ to $t_8$, and combinations of oscillator signals $OSC_1$ and $OSC_2$ after time $t_8$. Plot 150E illustrates an input signal $OSC_{S2}$ that appears at the inverting input of comparator $50_2$ and which is comprised of oscillator signal $OSC_1$ from times $t_0$ to $t_8$, and combinations of oscillator signals $OSC_1$ and $OSC_2$ after time $t_8$. Plot 150F illustrates input signals $OSC_{S1}$ and $OSC_{S2}$ in a single plot. It should be noted that comparator input signals $OSC_{S1}, \ldots, OSC_{Sn}$ can formed by selecting any oscillator signal or combination of oscillator signals from oscillator signals $OSC_1, \ldots, OSC_n$. In other words, comparator input signal $OSC_{S1}$ can be comprised of oscillator signal $OSC_1$, $OSC_2, \ldots, OSC_n$, either singly or in combination. Likewise, comparator input signal $OSC_{S2}$ can be comprised of oscillator signal $OSC_1$, $OSC_2, \ldots, OSC_n$, either singly or in combination, comparator input signal $OSC_{S3}$ can be comprised of oscillator signal $OSC_1$, $OSC_2, \ldots, OSC_n$, either singly or in combination, and comparator input signal $OSC_{Sn}$ can be comprised of oscillator signal $OSC_1$, $OSC_2, \ldots, OSC_n$, either singly or in combination.

At time $t_0$, switches $58_1$ and $60_1$ are configured to be in open positions and switches $58_2$ and $60_2$ are configured to be in closed positions. As discussed above, FIG. 2 illustrates waveforms for embodiments in which n is equal to 2, therefore, two switches $58_1$ and $58_2$ and two switches $60_1$ and $60_2$ are described. Thus, oscillator signal $OSC_1$ is transmitted to the inverting input of comparator $50_1$ and to input $54_2$ of comparator circuit 54 through input $34_1$ and oscillator signal $OSC_2$ is transmitted to the inverting input of comparators $50_2$ and to input $54_1$ of comparator circuit 54 through input $34_2$. It should be noted that at time t, oscillator signal $OSC_1$ and input signal $OSC_{S1}$ are substantially equal to each other and oscillator signal $OSC_2$ and input signal $OSC_{S2}$ are substantially equal to each other. In response to oscillator signals $OSC_1$ and $OSC_2$ from oscillator 14, an error signal from error amplifier 16, and current sense signals from current sense circuits $86_1$ and $86_2$, PWM circuit 12 generates pulse width modulated signals $PWM_1$ and $PWM_2$ at outputs $44_1$ and $44_2$, respectively, which are transmitted to output driver circuits $18_1$ and $18_2$.

During the time period $t_0$-$t_4$, oscillator signal $OSC_1$ is a ramp signal that decreases linearly from voltage level $V_{OSCH}$ to voltage level $V_{OSCL}$, whereas oscillator signal $OSC_2$ is a ramp signal that increases linearly from voltage level $V_{OSCL}$ to voltage level $V_{OSCH}$. Oscillator signals $OSC_1$ and $OSC_2$ reach minimum ($V_{OSCL}$) and maximum ($V_{OSCH}$) voltage levels, respectively, at time $t_4$. Then, from time $t_4$ to time $t_7$, oscillator signal $OSC_1$ is a ramp signal that increases linearly from voltage level $V_{OSCL}$ to voltage level $V_{OSCH}$ and oscillator signal $OSC_2$ is a ramp signal that decreases linearly from voltage level $V_{OSCH}$ to voltage level $V_{OSCL}$. Thus, oscillator signals $OSC_1$ and $OSC_2$ cycle through a complete period, i.e., period $T_1$, from time $t_0$ to time $t_7$ and begin a new period, i.e., period $T_2$, at time $t_7$. In accordance with embodiments of the present invention, period $T_2$ occurs between times $t_7$ and $t_{15}$.

From time $t_7$ to time $t_{11}$, oscillator signal $OSC_1$ is a ramp signal that decreases linearly from voltage level $V_{OSCH}$ to voltage level $V_{OSCL}$ and oscillator signal $OSC_2$ is a ramp signal that increases linearly from voltage level $V_{OSCL}$ to voltage level $V_{OSCH}$. Oscillator signals $OSC_1$ and $OSC_2$ reach minimum and maximum levels, respectively, at time $t_{11}$, then from time $t_{11}$ to time $t_{15}$, oscillator signal $OSC_1$ is a ramp signal that increases linearly from voltage level $V_{OSCL}$ to voltage level $V_{OSCH}$ and oscillator signal $OSC_2$ is a ramp signal that decreases linearly from voltage level $V_{OSCH}$ to voltage level $V_{OSCL}$.

At times $t_2$, $t_6$, $t_8$, $t_{13}$, $t_{18}$, $t_{20}$, and $t_{26}$, oscillator signals $OSC_1$ and $OSC_2$ intersect at voltage level $V_{INT}$, i.e., the voltage levels of oscillator signals $OSC_1$ and $OSC_2$ are equal. At times $t_4$, $t_7$, $t_{11}$, $t_{15}$, $t_{19}$, $t_{23}$, and $t_{28}$, oscillator signal $OSC_1$ is at voltage level $V_{OSCL}$ and oscillator signal $OSC_2$ is at voltage level $V_{OSCH}$. Likewise, at times $t_2$, $t_6$, $t_9$, $t_{13}$, $t_{18}$, $t_{20}$, and $t_{26}$, input signals $OSC_{S1}$ and $OSC_{S2}$ intersect at voltage level $V_{INT}$, i.e., the voltage levels of oscillator signals $OSC_1$ and $OSC_2$ are equal.

At time $t_3$, the signal appearing at output $44_1$ increases from a logic low voltage level, $V_L$, to a logic high voltage level $V_H$, which causes current $IL84_1$ to increase from lower peak current level $I_{P-}$. At time $t_5$, the signal appearing at output $44_1$ decreases from a logic high voltage level, $V_H$, to a logic low voltage level $V_L$, which causes current $IL84_1$ to decrease from upper peak current level $I_{P+}$. Thus, a pulse $PWM_1$ appears at output $44_1$ having rising and falling edges, where the rising edge causes current $IL84_1$ to increase and the falling edge causes current $IL84_1$ to decrease. Between times $t_3$ and $t_5$, current $IL84_1$ increases to a level that is greater than current $IL84_2$. From time $t_4$ to time $t_7$, oscillator signal $OSC_1$ and comparator input signal $OSC_{S1}$ rise from voltage level $V_{OSCL}$ to voltage level $V_{OSCH}$.

At time $t_6$, i.e., at a time when oscillator signal $OSC_1$ is rising, the voltage levels of oscillator signals $OSC_1$ and $OSC_2$ equal voltage $V_{INT}$, that is, they are equal to each other. Because oscillator signal $OSC_1$ is rising when oscillator signals $OSC_1$ and $OSC_2$ intersect at time $t_6$, switches $58_1$ and $58_2$ remain open and switches $60_1$ and $60_2$ remain closed. However, at time $t_7$ oscillator signal $OSC_1$ reaches a maximum voltage level $V_{OSCH}$ and begins to decrease. At time $t_8$, oscillator signals $OSC_1$ and $OSC_2$ intersect, i.e., they are at substantially the same voltage level, oscillator signal $OSC_1$ is decreasing, and current $IL84_1$ is greater than current $IL84_2$. Under these conditions for oscillator signals $OSC_1$ and $OSC_2$, comparator input signals $OSC_{S1}$ and $OSC_{S2}$, and currents $IL84_1$ and $IL84_2$, comparator circuits 54 and 56 generate switching signals that cause switch control circuit 68 to close switches $58_1$ and $60_1$ and open switches $58_2$ and $60_2$, thereby switching which oscillator signals appear at the inverting inputs of comparators $50_1$ and $50_2$. After the switch, oscillator signal $OSC_1$ appears at the inverting input of comparator $50_1$ and oscillator signal $OSC_2$ appears at the inverting input of comparator $50_2$. Before the switch, oscillator signal $OSC_1$ appeared at the inverting input of comparator $50_2$ and oscillator signal $OSC_2$ appeared at the inverting input of comparator $50_1$. Thus, switching the oscillator signals at the inputs of comparators $50_1$ and $50_2$ is referred to as switching the phases of the input signals. It should be noted that signal $OSC_{S1}$ shown in plot 150D is the input signal appearing at the inverting input of comparator $50_1$ and signal $OSC_{S2}$ is the input signal appearing at the inverting input of comparator $50_2$. Thus, switching the oscillator signals at the inputs of comparators $50_1$ and $50_2$ to assign the lowest inductor current to the comparator input signal having the lowest level rapidly balances the currents.

At time $t_9$, the signal appearing at output $44_2$ increases from a logic low voltage level, $V_L$, to a logic high voltage level $V_H$, which causes current $IL84_2$ to increase from lower peak current level $I_{P-}$. At time $t_{12}$, the signal appearing at output $44_2$ decreases from a logic high voltage level, $V_H$, to a logic low voltage level $V_L$, which causes current $IL84_2$ to decrease from upper peak current level $I_{P+}$. Thus, a pulse $PWM_2$ appears at output $44_2$ having rising and falling edges, where the rising edge causes current $IL84_2$ to increase and the falling edge causes current $IL84_2$ to decrease. Between times $t_9$ and $t_{11}$, current $IL84_2$ increases to a level that is greater than current $IL84_1$. From time $t_{11}$ to time $t_{15}$, oscillator signal $OSC_1$ and comparator input signal $OSC_{S1}$ fall from voltage level $V_{OSCH}$ to voltage level $V_{OSCL}$. At time $t_{13}$, the voltage levels of oscillator signals $OSC_1$ and $OSC_2$ and comparator input signals $OSC_{S1}$ and $OSC_{S2}$ are equal, oscillator signal $OSC_1$ and comparator input signal $OSC_{S1}$ are decreasing, and current $IL84_2$ is greater than current $IL84_1$. Under these conditions for oscillator signals $OSC_1$ and $OSC_2$, comparator input signals $OSC_{S1}$ and $OSC_{S2}$, and currents $IL84_1$ and $IL84_2$, switches $58_1$ and $60_1$ remain closed, switches $58_2$ and $60_2$ remain open, and oscillator signals $OSC_1$ and $OSC_2$ are not switched.

At time $t_{14}$, the signal appearing at output $44_1$ increases from a logic low voltage level, $V_L$, to a logic high voltage level $V_H$, which causes current $IL84_1$ to increase from lower peak current level $I_{P-}$. At time $t_{16}$, the signal appearing at output $44_1$ decreases from a logic high voltage level, $V_H$, to a logic low voltage level $V_L$, which causes current $IL84_1$ to decrease from upper peak current level $I_{P+}$. Thus, another pulse $PWM_1$ appears at output $44_1$ having rising and falling edges, where the rising edge causes current $IL84_1$ to increase and the falling edge causes current $IL84_1$ to decrease. Between times $t_{14}$ and $t_{17}$, current $IL84_1$ increases to a level that is greater than current $IL84_2$. From time $t_{15}$ to time $t_{19}$, input signal $OSC_{S1}$ rises from voltage level $V_{OSCL}$ to voltage level $V_{OSCH}$.

At time $t_{18}$, i.e., at a time when comparator input signal $OSC_{S1}$ is rising, the voltage levels of oscillator signals $OSC_1$ and $OSC_2$ and comparator input signals $OSC_{S1}$ and $OSC_{S2}$ equal voltage $V_{INT}$, that is, they are equal to each other. Because input signal $OSC_{S1}$ is rising when oscillator signals $OSC_{S1}$ and $OSC_{S2}$ intersect at time $t_{18}$, switches $58_1$ and $60_1$ remain closed and switches $58_2$ and $60_2$ remain open. However, at time $t_{19}$ input signal $OSC_{S1}$ reaches a maximum voltage level $V_{OSCH}$ and begins to decrease. Thus, at time $t_{20}$, input signals $OSC_{S1}$ and $OSC_{S2}$ intersect, i.e., their voltage levels are equal, comparator input signal $OSC_{S1}$ is decreasing, and current $IL84_1$ is greater than current $IL84_2$. Under these conditions for oscillator signals $OSC_1$ and $OSC_2$, comparator input signals $OSC_{S1}$ and $OSC_{S2}$, and currents $IL84_1$ and $IL84_2$, comparator circuits 54 and 56 generate switching signals that cause switch control circuit 68 to open switches $58_1$ and $60_1$ and close switches $58_2$ and $60_2$, thereby switching which oscillator signals appear at the inverting inputs of comparators $50_1$ and $50_2$. After the switch, input signal $OSC_{S1}$ appears at the inverting input of comparator $50_2$ and oscillator signal $OSC_{S2}$ appears at the inverting input of comparator $50_1$. Before the switch, input signal $OSC_{S2}$ appeared at the inverting input of comparator $50_1$ and input signal $OSC_{S1}$ appeared at the inverting input of comparator $50_2$. Thus, switching the oscillator signals at the inputs of comparators $50_1$ and $50_2$ to assign the lowest inductor current to the comparator input signal having the lowest level rapidly balances the currents.

At time $t_{21}$, the signal appearing at output $44_2$ increases from a logic low voltage level, $V_L$, to a logic high voltage level $V_H$, which causes current $IL84_2$ to increase from lower peak current level $I_{P-}$. At time $t_{24}$, the signal appearing at output $44_2$ decreases from a logic high voltage level, $V_H$, to a logic low voltage level $V_L$, which causes current $IL84_2$ to decrease from upper peak current level $I_{P+}$. Thus, another pulse $PWM_1$ appears at output $44_1$ having rising and falling edges, where the rising edge causes current $IL84_1$ to increase and the falling edge causes current $IL84_1$ to decrease. Between times $t_{22}$ and $t_{25}$, current $IL84_2$ increases to a level that is greater than current $IL84_1$. From time $t_{23}$ to time $t_{26}$, input signal $OSC_{S1}$ rises from voltage level $V_{OSCL}$ to voltage level $V_{OSCH}$. At time $t_{25}$, the voltage levels of comparator input signals $OSC_{S1}$ and $OSC_{S2}$ are equal, comparator input signal $OSC_{S1}$ is increasing, and current $IL84_2$ is greater than current $IL84_1$. Under these conditions for input signals $OSC_{S1}$ and $OSC_{S2}$ and currents $IL84_1$ and $IL84_2$, switches $58_1$ and $60_1$ remain open and switches $58_2$ and $60_2$ remain closed and input signals $OSC_{S1}$ and $OSC_{S2}$ are not switched.

Figure 3:
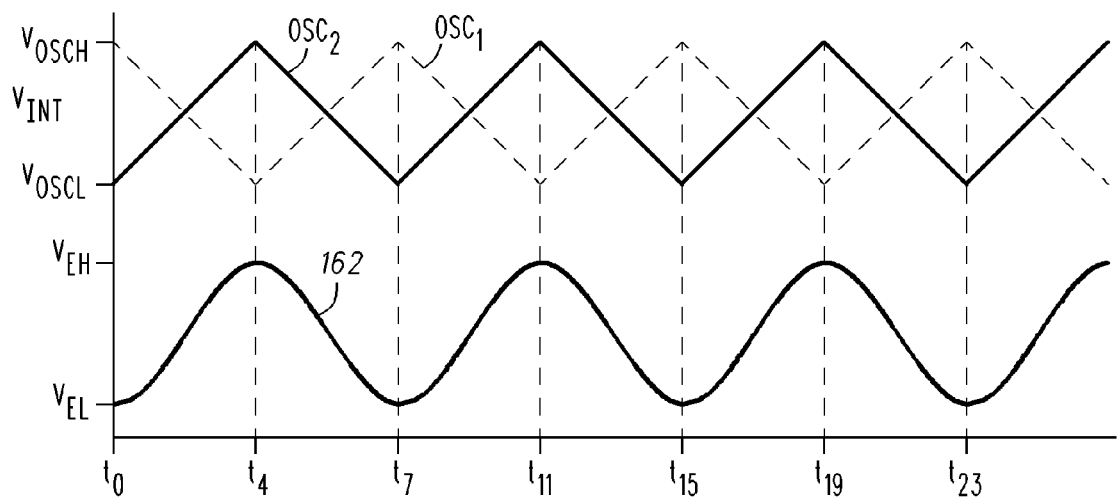
FIG. 3 is another timing diagram for a multi-phase controller circuit in accordance with an embodiment of the present invention.

FIG. 3 illustrates a timing relationship 160 between an error signal 162 and oscillator signals $OSC_1$ and $OSC_2$. More particularly, FIG. 3 shows that for an error signal with a large signal content at the frequency of oscillator signals $OSC_1$ and $OSC_2$ the current can be balanced between the phases without altering the total duty cycle applied to an output filter.

By now it should appreciated that a multi-phase power converter circuit and a method for balancing current in a multi-phase power converter circuit have been provided. Preferably, current is dynamically balanced by swapping oscillator signals in a pulse width modulator circuit. This provides a multi-phase system that can rapidly balance currents on a cycle-by-cycle basis during dynamic loading because an oscillator signal that is falling from a higher voltage level to a lower voltage level is more likely to generate a higher duty pulse width modulation signal than an oscillator signal that is rising from a lower voltage level to a higher voltage level. Thus, if the inductor current is lower in a particular phase, it is assigned to the oscillator signal at the lowest voltage level to rapidly balance the current.

In accordance with embodiments of the present invention, when multi-phase power converter 10 starts running, switch control circuit 68 receives clock signals from comparator circuit 54 that indicate which of the ramps from oscillator 14 have intersected. The ramps that have intersected may be swapped between PWM comparators $50_1, \ldots, 50_n$. Ramp signal swapping is based on the states of inductor currents $IL84_1, \ldots, IL84_n$ as determined by current comparator circuit 56. At or near the time of the ramp intersection, the oscillator signal that is transitioning from a higher level to a lower level, i.e., a ramp signal that is heading down, will be swapped to the PWM comparator $50_1, \ldots, 50_n$ associated with the phase with the lower current if it is not already connected to it. Likewise, the oscillator signal that is transitioning from a lower level to a higher level, i.e., a ramp signal that is headed up, will be swapped to the PWM comparator $50_1, \ldots, 50_n$ that is associated with the phase of the higher current via signal MUX 58. Preferably, no two PWM comparators $50_1, \ldots, 50_n$ can be connected to the same oscillator signal and the number of oscillator signals is designed so that there is one oscillator signal for every PWM signal. Thus, at every intersection of the ramp phases, the ramp signals are swapped between PWM comparators $50_1, \ldots, 50_n$.

Although certain preferred embodiments and methods have been disclosed herein, it will be apparent from the foregoing disclosure to those skilled in the art that variations and modifications of such embodiments and methods may be made without departing from the spirit and scope of the invention. For example, oscillator 14 may be used to generate the signals transmitted to input 66 of switch control circuit 68 rather than using comparator circuit 54, i.e., comparator circuit 54 may be absent. In addition, ramp swapping may be enabled during dynamic loading which can be determined from the output error signal at input 38. In this case, when ramp swapping is disabled, switch control circuit 68 can swap the ramps back to their original order to maintain a state phase firing order. It is intended that the invention shall be limited only to the extent required by the appended claims and the rules and principles of applicable law.

What is claimed is:

1. A method for current balancing in a multi-phase power converter having a plurality of outputs, comprising:
   providing a plurality of currents;
   providing a plurality of input signals, the plurality of input signals generated in response to corresponding oscillator signals; and
   switching at least first and second input signals in accordance with current levels of at least two currents of the plurality of currents, levels of at least two input signals of the plurality of input signals, and whether one or more of at least one input signal of the plurality of input signals is one of increasing or decreasing.

2. The method of claim 1, wherein switching at least the first and second input signals comprises:
   determining that a first current of the plurality of currents is less than a second current of the plurality of currents; and
   determining that a first input signal of the plurality of input signals is decreasing.

3. The method of claim 2, wherein switching at least the first and second input signals includes generating a switching signal in response to the first and second input signals of the plurality of input signals intersecting.

4. The method of claim 1, wherein generating the switching signal includes:
   generating a first pulse having first and second edges; and
   in response to a first edge of the first pulse, increasing a first current of the plurality of currents to a level that is greater than a level of a second current of the plurality of currents.

5. The method of claim 4, further including decreasing the first current of the plurality of currents in response to the second edge of the pulse signal.

6. The method of claim 5, further including generating a first switching signal in response to a first input signal of the plurality of input signals decreasing from a first level to a second level.

7. The method of claim 6, further including generating the first switching signal in response to the first input signal of the plurality of input signals being at the same level as the second input signal of the plurality of input signals.

8. The method of claim 7, further including:
   generating a second pulse having first and second edges; and
   in response to a first edge of the second pulse, increasing a second current of the plurality of currents to a level that is greater than a level of a first current of the plurality of currents.

9. The method of claim 8, further including:
generating a third pulse having first and second edges;
in response to a first edge of the third pulse, increasing the first current of the plurality of currents;
after the first current of the plurality of currents is greater than the second current of the plurality of currents, decreasing the first current of the plurality of currents in response to the second edge of the pulse signal; and
generating a second switching signal in response to the second input signal of the plurality of input signals decreasing from the first level to the second level and in response to the second input signal of the plurality of input signals being at the same level as the first input signal of the plurality of input signals.

10. A method for current balancing in a system that has an error signal, comprising:
providing a plurality of input signals, the plurality of input signals generated in response to corresponding oscillator signals, wherein a first input signal of the plurality of input signals has a first phase, a second input signal of the plurality of input signals has a second phase, and where the first and second phases are different from each other; and
switching the first phase of the first input signal with the second phase of the second input signal to balance currents in the system.

11. The method of claim 10, further including:
providing a plurality of currents, wherein a first current of the plurality of currents has a rising edge and a falling edge and a second current of the plurality of currents has a rising edge and a falling edge, and wherein the first and second currents of the plurality of currents are out of phase from each other and the first current is less than the second current;
increasing the first current; and
after the first current is greater than the second current, decreasing the first current.

12. The method of claim 11, wherein increasing the first current includes:
increasing the first current to be greater than the second current in response to a first edge of a first pulse; and
decreasing the first current includes decreasing the first current in response to a second edge of the first pulse, and wherein the first and second currents are decreasing in response to the second edge of the first pulse.

13. The method of claim 12, wherein switching the first phase of the first input signal with the second phase of the second input signal includes changing the direction of the first input signal from decreasing to increasing in response to the first and second input signals having the same value and the first current being larger than the second current.

14. The method of claim 12, further including:
providing a plurality of currents, wherein a first current of the plurality of currents has a rising edge and a falling edge and a second current of the plurality of currents has a rising edge and a falling edge, and wherein the first current is less than the second current;
increasing the first current to be greater than the second current in response to a first edge of a first pulse; and
after the first current is greater than the second current, decreasing the first current in response to a second edge of the first pulse, and wherein the first and second currents are decreasing in response to the second edge of the first pulse; and
switching the first phase of the first input signal with the second phase of the second input signal includes changing the direction of the first input signal from increasing to decreasing in response to the first and second input signals having the same value and the first current being larger than the second current.

15. The method of claim 10, wherein each input signal of the plurality of input signals has substantially the same frequency.

16. A multi-phase power converter, comprising:
a pulse width modulator having at least one input and at least one output, wherein the pulse width modulator comprises:
a first oscillator signal switching circuit having a first input, a second input, and an output;
a second oscillator signal switching circuit having a first input, a second input, and an output; and
a switch control circuit having at least first and second inputs and a plurality of outputs, wherein a first input of the at least one input is coupled to the first input of the first oscillator signal switching circuit and to the first input of the second oscillator signal switching circuit.

17. The multi-phase power converter of claim 16, wherein the first switching circuit comprises:
a first comparator having an inverting input, a non-inverting input, and an output;
a first switch coupled between the inverting input of the first comparator and a first input of the plurality of inputs of the pulse width modulator, wherein a first output of the plurality of outputs of the switch control circuit is coupled to the first switch;
a second switch coupled between the inverting input and a second input of the plurality of inputs of the pulse width modulator, wherein a second output of the plurality of outputs of the switch control circuit is coupled to the first switch;
the second switching circuit comprises:
a second comparator having an inverting input, a non-inverting input, and an output;
a third switch coupled between the inverting input of the second comparator and the second input of the plurality of inputs of the pulse width modulator, wherein a third output of the plurality of outputs of the switch control circuit is coupled to the third switch; and
a fourth switch coupled between the inverting input of the second comparator and the first input of the plurality of inputs of the pulse width modulator, wherein a fourth output of the plurality of outputs of the switch control circuit is coupled to the fourth switch.

18. The multi-phase power converter of claim 17, further including
a third comparator having an inverting input, a non-inverting input, and an output, wherein the non-inverting input is coupled to the inverting inputs of the first and second comparators through the second and third switches, respectively, the inverting input is coupled to the inverting inputs of the first and second comparators through the first and fourth switches, respectively; and a fourth comparator having an inverting input, a non-inverting input, and an output, wherein the output is coupled to the second input of the switch control circuit.

19. The multi-phase power converter of claim 18, further including:
   an oscillator having a plurality of outputs, wherein a first output of the plurality of outputs is coupled to the first input of the plurality of inputs of the pulse width modulator, a second output of the plurality of outputs is coupled to the second input of the plurality of inputs of the pulse width modulator; and
   an error circuit having an output coupled to the inverting inputs of the first and second comparators.

20. The multi-phase power converter of claim 19, further including:
   a first output stage having an input coupled to a first output of the plurality of outputs of the pulse width modulator, and a current sense output coupled to the non-inverting input of the fourth comparator; and
   a second output stage having an input coupled to a second output of the plurality of outputs of the pulse width modulator, and a current sense output coupled to the inverting input of the fourth comparator.

* * * * *